United States Patent [19]

Kruger, Jr. et al.

[11] Patent Number: 4,508,744
[45] Date of Patent: Apr. 2, 1985

[54] BEVERAGE CLOUDING AGENT BASED ON CARNAUBA WAX

[75] Inventors: Albert J. Kruger, Jr., Altamonte Springs, Fla.; John K. Johnson, Decatur, Ga.

[73] Assignee: The Coca Cola Company, Atlanta, Ga.

[21] Appl. No.: 504,457

[22] Filed: Jun. 15, 1983

[51] Int. Cl.³ ............................................. A23L 2/00
[52] U.S. Cl. ................................. 426/590; 426/651; 426/658
[58] Field of Search ............... 426/590, 531, 591, 592, 426/610, 611, 612, 650, 651, 654, 658, 330.3, 330.5, 98

[56] References Cited

U.S. PATENT DOCUMENTS

| | | | |
|---|---|---|---|
| 3,652,291 | 3/1972 | Bedoukian | 426/651 |
| 3,658,552 | 4/1972 | Carlson et al. | 426/590 |
| 3,660,105 | 5/1972 | Kesterson et al. | 426/590 |
| 3,959,510 | 5/1976 | Felton et al. | 426/548 |
| 3,988,512 | 10/1976 | Johnson | 426/590 |
| 4,093,750 | 6/1978 | Babayan | 426/250 |
| 4,143,174 | 3/1979 | Shah et al. | 426/570 |
| 4,187,326 | 2/1980 | Serafino et al. | 426/590 |
| 4,279,940 | 7/1981 | Wurzburg et al. | 426/590 |
| 4,335,143 | 6/1982 | Wiener et al. | 426/50 |

FOREIGN PATENT DOCUMENTS 1537160 12/1978 United Kingdom .
1569292 6/1980 United Kingdom .

Primary Examiner—Raymond Jones
Assistant Examiner—Marianne S. Minnick
Attorney, Agent, or Firm—Kenyon & Kenyon

[57] ABSTRACT

The present invention provides for a clouding agent which is free of brominated vegetable oils or glyceryl abietate and which produces a non-ringing, taste-free, precipitation-free cloud in still or carbonated beverages, said clouding agent comprising carnauba wax, a water soluble gum, water, a polyhydric alcohol of two to six carbons, and an edible salt.

23 Claims, No Drawings

BEVERAGE CLOUDING AGENT BASED ON CARNAUBA WAX

BACKGROUND OF THE INVENTION

1. Field of the Invention

The present invention relates to an edible stable clouding agent to be used in a beverage. More specifically, the invention relates to a stable clouding agent comprised of a water soluble gum, carnauba wax, a polyhydric alcohol of two to six carbons, and an edible salt.

2. Description of the Prior Art

Many natural juices, including all freshly expressed citrus juices, have a characteristic turbidity or "cloudiness". It is desirable to maintain this cloudiness when processing natural juices, and to emulate it when preparing formulated beverages.

In a natural citrus juice, "cloud" is provided by minute, suspended or colloidal particles of citrus tissue and cell contents. In formulated beverages, however, various "clouding agents" have been utilized to simulate a natural cloud. For example, one known clouding agent is based on brominated oils of specific gravity greater than 1.00 g/ml in combination with lower density flavor oils or vegetable oil, such as citrus oils which have a specific gravity of about 0.85; see U.S. Pat. No. 3,353,961, issued Nov. 21, 1967 to Simon. Such a blend of oils is "balanced" so as to have a density close to that of the beverage in which it is to be suspended. (As an example, sugar sweetened drinks have a preferred specific gravity of about 1.03–1.06 while dietetic drinks have a specific gravity of about 1.0.).

By balancing the relatively low density flavor oil, such as citrus oils, with the high density brominated oil, it is possible to inhibit the highly insoluble citrus oils from floating to the top of the particular formulated beverage and from forming a "ring". Instead, the dispersion of the balanced oil in aqueous solutions has a desirable cloudy appearance.

However, brominated vegetable oils may now constitute only 15 ppm of a finished formulated beverage. This amount is about 10% of the concentration formerly used to prepare effective clouding agents. Consequently, brominated vegetable oils are now less effective as clouding agents.

As a substitute for brominated vegetable oils, the beverage industry generally turned to glyceryl abietate, or "Ester Gum", which is an F.D.A. approved oil-soluble material also of density greater than 1.00 g/ml; see U.S. Pat. No. 3,959,510, issued May 25, 1976 to Felton and Kapp. Although glyceryl abietate, like brominated vegetable oils, can be effectively utilized to prepare an adequate clouding agent, it does have objectional features. Since its specific gravity is 1.08 as compared to approximately 1.30 for brominated vegetable oils, about three times as much Ester Gum is required to achieve the same degree of balancing as is achieved by use of brominated oils. If too much Ester Gum were used, the taste of the finished beverage could possess a bitter character which is often undesirable. Another difficulty arises from the fact that although both glycerol and abietic acid are natural products, Ester Gum is nevertheless produced synthetically from abietic acid, which precludes its use in those beverages which the producer wishes to label as natural.

A desirable clouding agent for use in a formulated beverage will avoid the difficulties associated with the aforementioned known clouding agents, as well as possess various other advantages. Specifically, such a clouding agent would be non-toxic, impart little or no taste to the final beverage, and be effective in producing a non-ringing, cloudy beverage. Also important to such a desirable agent would be its ability to produce a final cloudy beverage which is non-ringing for significant periods of time, specifically at least three months.

SUMMARY OF THE INVENTION

The clouding agent of the present invention is an emulsified composition of finely divided particles of carnauba wax, a water soluble gum, a polyhydric alcohol of two to six carbons, water, and an edible inorganic salt. An edible essential oil distillate such as orange oil distillate and additional resins such as gum elemi may also be incorporated. Important features of the invention include the size distribution of the carnauba wax particles, as well as the weight ratio of wax to alcohol and wax to salt. These features combine to produce the non-ringing stability of the final beverage cloud for periods of at least three months.

The wax particle size, as determined by Coulter Counter, is represented herein by specific interfacial area, which is the measured area in square meters of the oil/water interface per cubic centimeter of disperse phase. As the interfacial area increases, the particle size decreases. In general, the wax particle size will range from an interfacial area of 12.5 meter$^2$/centimeter$^3$ to 15.0 m$^2$/cm$^3$, and preferably from 13.0 to 13.6 m$^2$/cm$^3$.

The weight ratio of wax to salt will generally be from about 1:2 to 2:3 with 2:3 being preferred. The weight ratio of carnauba wax to alcohol will generally be from about 1:4 to 1:3, with 1:4 being preferred.

The carnauba wax will comprise about 5.0 to 8.0, preferably about 6.0, percent by weight of the clouding agent. The water-soluble gum usually comprises about 15.0 to 30.0, preferably about 18.0 to 22.0, percent by weight of the emulsified clouding agent. The alcohol typically comprises about 20.0 to 24.0, preferably about 22.0, percent by weight of the emulsion. The salt typically comprises about 8.0 to 12.0, preferably about 9.0, percent by weight of the emulsion. If an essential oil distillate is used, it may comprise up to about 3.0, preferably about 1.0 to 2.0, percent by weight of the emulsion. Also, if a purified gum elemi is used, it may comprise up to about 6.0, preferably up to about 4.0, percent by weight of said emulsion.

The water-soluble gum is preferably gum acacia. Other gums and suitable hydrocolloids may also be used. A preferred edible salt is sodium chloride. Another suitable salt is potassium chloride.

The polyhydric alcohol should have a chain length of two to six carbons, or alternatively, a molecular weight up to 360. A preferred alcohol is glycerol although other suitable alcohols include propylene glycol and sorbitol.

The clouding agent herein disclosed is an emulsion which is prepared by combining the wax with a heated solution of the other ingredients. If optional ingredients such as an essential oil distillate and/or purified gum elemi are used, they are first blended with the carnauba wax. To form such a blend, the wax plus optional oil distillate and/or elemi are combined by heating the mixture to a temperature sufficient to melt the carnauba wax; usually a temperature of about 85° C. will be sufficient. The wax or wax blend is then emulsified with a solution of water, water-soluble gum, alcohol and an edible salt.

To perform the emulsification process, the homogeneous solution of water, a water-soluble gum, alcohol, and an edible salt is prepared, then the solution is heated to a temperature sufficient to permit the wax or wax blend to melt when it is stirred into the solution. A temperature of about 95°–100° C. is preferred.

The resultant mixture of wax, water, alcohol, gum, and salt is subsequently emulsified by any conventional means capable of producing a final emulsion wherein the particle size of the carnauba wax is characterized by an interfacial area of 12.5 to 15.0 $m^2/cm^3$, preferably 13.0 to 13.6 $m^2/cm^3$. A preferred method of emulsification involves the use of a conventional heat jacketed, 2 stage pressure homogenizer, maintained at a temperature between about 92°–100° C., and a total pressure of 3000 to 7500 psig, preferably 4500 to 6000 psig.

The emulsified clouding agent thus obtained is capable of being used in a number of ways well known in the beverage industry art. One example is to prepare a beverage syrup by mixing the clouding agent with a sugar-in-water syrup and other conventional ingredients.

Such a beverage syrup may in turn be converted into a final, cloudy beverage by the addition of still or carbonated water. This final, cloudy beverage will be stable against ring formation or settling out for periods of at least three months.

DESCRIPTION OF THE PREFERRED EMBODIMENTS

The clouding agent of the present invention provides several advantages over known clouding agents. For example, it imparts little or no taste to a final beverage in which it is placed. Moreover, all of the ingredients of the agent are naturally-occurring and non-toxic.

The clouding agent of the present invention is intended for use in the preparation of still or carbonated aqueous beverages.

A clouding agent prepared in accordance with the present disclosure, comprises in part carnauba wax. It has been found that other edible waxes, e.g. candela and bees wax, do not perform in a manner equivalent to the carnauba wax. Carnauba wax is a natural, non-toxic wax having a specific gravity of about 0.995 and a melting point of about 82°–86° C. Two types of carnauba wax are known—"raw" and "purified."

Both function equally well in the invention.

The carnauba wax may optionally be blended with certain ingredients known in the art, such as an essential oil distillate, e.g. an orange distillate, and/or natural resins such as purified solid gum elemi, to produce a distillate-wax-resin blend having a density of 0.993 g/ml to 0.987 g/ml. If elemi is added, it is preferred that it be purified first so as to remove any volatile oils which would impart an undesirable taste to the final product.

The gum elemi which may be used in the present invention is derived from resins obtained from a tree of the Kanarium family. Although many kinds of elemi resins exist, they are all characterized by the constituent triterpene, amyline ($C_{30}H_{49}OH$), which, it is speculated, contributes to emulsion stability. Elemi resins and their purified fractions are non-toxic.

The elemi may be purified by resort to any of a number of conventional means such as distillation, extraction, chromatography and precipitation. For example, it may be steam distilled or it may be purified by solubilizing the natural gum elemi with 1.6 parts by weight isopropyl alcohol, isolating the non-soluble portion by filtration, and finally evaporating any alcohol in the filtrate to produce a purified elemi with a density of 1.02 g/ml and a melting point of 130°–142° C.

If the carnauba wax is blended with purified elemi and/or an essential oil distillate, it is not necessary to heat the distillate-wax-resin combination beyond about 79°–83° C. in order to effect solution of the elemi and distillate into the Carnauba wax. Upon cooling, such a blend will form a solid having a melting point of about 68°–75° C.

This distillate-wax-resin blend or the pure carnauba wax is then converted to a clouding agent emulsion by emulsification with water, a water-soluble gum, preferably a preservative, alcohol and salt. The salt will typically be sodium chloride, however, any edible inorganic salt of alkali or alkaline earth metals and halides, or sulfate may be used in the present invention. The halide salts of the alkali metals are preferred, especially sodium and potassium chlorides.

The emulsion is prepared by heating a homogeneous solution of the water, gum, alcohol and salt to a temperature high enough to melt the carnauba wax or wax blend when it is added, preferably between about 95°–100° C. The resultant mixture of wax and water, gum, alcohol and salt is then emulsified by any means sufficient to produce an emulsion in which the particle size of the carnauba wax is characterized by an interfacial area of 12.5 to 15.0 $m^2/cm^3$, preferably 13.0 to 13.6 $m^2/cm^3$. Methods of emulsification known in the art include simple stirring, aeration, propeller agitation, turbine agitation, use of a colloid mill, use of ultrasonics, and homogenization. For a more detailed description of these various emulsification methodologies, see Griffin, "Emulsions", in 8 Kirk-Othmer Encyclopedia of Chemical Technology 900–930 (3d ed. 1979). One good emulsification technique is to employ a shear homogenizer. A preferred method involves the use of a conventional heat jacketed, 2 stage pressure homogenizer maintained at a temperature between about 92°–100° C. (high enough to maintain the wax in its molten state) and a total pressure of 3000 to 7500 psig, preferably 4500 to 6000 psig.

Although the exact means by which the clouding agent functions is not known, it does not utilize the aforementioned "balancing" of a relatively low density oil with a heavier oil or gum in order to produce a blend having a density close to that of the beverage in which it is to be suspended. It is believed that the functioning of the clouding agent of the invention involves cooperation of the carnauba wax and salt plus alcohol to form a "micelle-like" structure wherein a microparticle of carnauba wax is suspended in water as a consequence of being surrounded by the salt ions and/or hydrogen bonded alcohol molecules. While true micelles are much smaller than the microparticles of the carnauba wax, the cooperative behavior of the wax particles, salt and alcohol may be similar to that of true micelles. Moreover, it is believed that the salt ions and alcohol produce an electrostatic effect around the wax particles, rather than functioning merely as solution density modifiers. This is because the ability of the clouding agent to avoid ringing decreases rather sharply outside the range of disclosed weight ratios of wax-to-salt and wax-to-alcohol.

The clouding agent emulsion so produced may be used in a number of conventional ways. For example, it may be mixed with syrup (either sugar in water or artificial sweetener in water) and other conventional ingredients to prepare a beverage syrup, which beverage syrup may in turn be converted into the final cloudy beverage by addition of still or carbonated water. Suggested concentrations of the clouding agent emulsion in the finished beverage correspond to about 0.05-0.20% by weight of the emulsion, based on the total weight of the final beverage. Such a suggested usage concentration range is only related to anticipated commercial desirability and in no way should be deemed a limitation on the effective concentration of emulsion in an aqueous beverage.

It also is possible to dry the clouding agent emulsion by such conventional methods as spray, freeze drum, or Foam-mat drying to form a dry mix having a moisture content no higher than about 5%. Such a dry mix may be optionally mixed with a solid edible acid, dry color, and/or sweetener to form a beverage powder, which may be converted to a final cloudy beverage by the addition of water.

The nature of the present invention may be further understood by the following examples of specific embodiments. Unless stated otherwise, all proportions here and elsewhere are in weight percent, based on the weight of the final clouding agent emulsion.

EXAMPLE 1

| A Carnauba Wax, Sodium Chloride, Glycerol, Gum Acacia Clouding Agent | |
|---|---|
| Ingredients | Weight Percent, based on the total weight of the clouding agent emulsion. |
| Water | 40.00 |
| Sodium Benzoate (a preservative) | 0.20 |
| Sodium Chloride | 9.00 |
| Glycerol | 22.80 |
| Spray-dried gum acacia | 20.00 |
| Carnauba wax | 6.00 |
| Orange oil distillate | 2.00 |

The Carnauba wax was melted at a temperature of about 79°-83° C. While the molten wax was kept at a temperature sufficient to maintain it in its molten state, the orange oil distillate was stirred into the molten wax in order to solubilize it. The heat source was subsequently removed to allow the distillate-wax blend to solidify. The blend had a melting point of about 68°-75° C.

The final clouding agent emulsion was prepared by adding the water, preservative, salt, glycerol, and gum acacia together and stirring at room temperature to form a homogeneous solution. This solution, while continuously stirred, was heated to a temperature of between about 95° to 100° C. While maintaining this temperature, the distillate-wax blend was stirred into said solution until the blend had melted, thereby forming a cloudifier premix.

This premix was then introduced into a conventional heat jacketed 2-stage pressure homogenizer maintained at a temperature of between about 92° to 100° C., so that the cloudifier premix was a liquid during homogenization. The total homogenization pressure was 6000 psi. After homogenization, the cloudifier emulsion was cooled to room temperature. The resultant clouding agent had a specific gravity of about 1.20 at 25° C., as well as an interfacial area of 13.6 $m^2/cm^3$, created a stable long-lasting cloud when utilized as part of an aqueous beverage, and imparted no significant taste.

EXAMPLE 2

| A Carnauba Wax Clouding Agent Containing Citric Acid | |
|---|---|
| Ingredient | Weight Percent, based on the total weight of the clouding agent emulsion. |
| Water | 40.25 |
| Sodium Benzoate | 0.10 |
| Glycerol | 20.00 |
| Citric Acid | 0.13 |
| Sodium Chloride | 9.00 |
| Gum acacia | 20.00 |
| Carnauba wax | 7.89 |
| Orange oil Distillate | 2.63 |

The Carnauba wax and orange oil distillate were combined in the same fashion as in Example 1. The distillate-wax blend was then combined with the remaining ingredients also as in Example 1 to form a clouding agent having an interfacial area of 12.4 $m^2/cm^3$ and showing good stability when used in an aqueous beverage.

EXAMPLE 3

| A Carnauba Wax Clouding Agent Outside the Invention | |
|---|---|
| Ingredient | Weight Percent, based on the total weight of the clouding agent emulsion |
| Orange oil Distillate | 2.63 |
| Carnauba wax | 7.89 |
| Water | 44.25 |
| Sodium benzoate | 0.10 |
| Citric Acid | 0.13 |
| Spray-dried gum acacia | 20.00 |
| Glycerol | 20.00 |
| Sodium Chloride | 5.00 |

The ingredients were generally combined as in Example 1 to form an emulsion, however the homogenization parameters were adjusted so that the interfacial area of the final emulsion was only 11.4 $m^2/cm^3$, which is outside the scope of the present invention. This clouding agent, when utilized as part of an aqueous beverage, produced a cloud which was not long-lasting, but rather was stable only for about 5 days.

Although the invention has been described in terms of specific embodiments set forth in detail, it should be understood that these embodiments are by way of illustration only, and that the invention is not so limited. Modifications and variations will be apparent from this disclosure and may be resorted to without departing from the spirit of this invention, as those skilled in this art will readily understand. Accordingly, such variations and modifications of the disclosed products are considered to be within the purview and scope of this invention and the following claims.

What is claimed is:

1. An edible clouding agent which comprises finely divided carnauba wax particles in an emulsion base comprising water, a water-soluble gum, a polyhydric alcohol of two to six carbons, and an edible salt, wherein the size of the wax particles is characterized by an interfacial area of 12.5 $m^2/cm^3$ to 15.0 $m^2/cm^3$, wherein the weight ratio of wax to salt is about 1:2 to 2:3, and the weight ratio of wax to alcohol is about 1:4 to 1:3.

2. An edible beverage clouding agent of claim 1, wherein the salt is an alkali metal salt and the polyhydric alcohol is chosen from the group consisting of propylene glycol, sorbitol, glycerol and combinations thereof.

3. An edible beverage clouding agent of claim 1, wherein the salt is sodium chloride and the polyhydric alcohol is glycerol.

4. An edible beverage clouding agent of claim 1, wherein the Carnauba wax is blended with at least one of the group consisting of purified gum elemi and an essential oil distillate.

5. An edible beverage clouding agent of claim 1 or 4 wherein the emulsion base further comprises a preservative.

6. An edible beverage clouding agent of claim 4 wherein the essential oil distillate is a natural orange oil distillate.

7. An edible beverage clouding agent of claim 5 wherein the preservative is sodium benzoate.

8. An edible beverage clouding agent of claim 1 wherein the water-soluble gum is gum acacia.

9. An edible beverage clouding agent of claim 1, comprising the following:

| Ingredient | Weight Percent, based on the total weight of ingredients |
| --- | --- |
| Water | 40.00 |
| Preservative | 0.20 |
| Sodium Chloride | 9.00 |
| Glycerol | 22.80 |
| Gum acacia | 20.00 |
| Carnauba Wax | 6.00 |
| Orange Oil Distillate | 2.00. |

10. An edible beverage clouding agent of claim 1, comprising the following:

| Ingredient | Weight Percent based on the total weight of ingredients |
| --- | --- |
| Water | 40.25 |
| Preservative | 0.10 |
| Glycerol | 22.00 |
| Citric acid | 0.13 |
| Sodium Chloride | 9.00 |
| Gum acacia | 20.00 |
| Carnauba Wax | 7.89 |
| Orange Oil Distillate | 2.63. |

11. A beverage syrup comprising a beverage clouding agent of claim 1 and flavored syrup.

12. A cloudy beverage, comprising a beverage syrup of claim 11 and still or carbonated water.

13. A cloudy beverage of claim 12 wherein the clouding agent of claim 1 comprises about 0.05–0.20 percent by weight of the total weight of the beverage, and said beverage is stable against ringing for at least three months.

14. A clouding agent of claim 1, wherein the agent has been dried to form a dry mix having a moisture content no higher than about 5%.

15. A process of preparing a beverage clouding agent, comprising the steps of heating a homogeneous solution of water, a water-soluble gum, a polyhydric alcohol of two to six carbons and an edible salt to a temperature sufficient to melt carnauba wax, adding carnauba wax and stirring until melted, and finally emulsifying the entire mixture to produce an emulsion having a wax interfacial area of 12.5 $m^2/cm^3$ to 15.0 $m^2/cm^3$, wherein the weight ratio of wax to salt is about 1:2 to 2:3, and the weight ratio of wax to alcohol is about 1:4 to 1:3.

16. A process of preparing a beverage clouding agent, comprising the steps of heating a homogeneous solution of water, a water-soluble gum, a polyhydric alcohol of two to six carbons and an edible salt to a temperature of about 95°–100° C., adding carnauba wax and stirring until melted, and finally homogenizing the entire mixture in a heat jacketed, 2 stage pressure homogenizer, maintained at a temperature between about 95°–100° C., and also having a total pressure of between about 3000°–7500 psi, to produce an emulsion having a wax interfacial area of 12.5 $m^2/cm^3$ to 15.0 $m^2/cm^3$, wherein the weight ratio of wax to salt is about 1:2 to 2:3, and the weight ratio of wax to alcohol is about 1:4 to 1:3.

17. A process of claim 16 wherein, prior to mixing with the other ingredients, the Carnauba wax is blended with at least one compound selected from the group consisting of an essential oil distillate and purified gum elemi.

18. A process of preparing a beverage syrup as defined in claim 11, comprising the step of adding a clouding agent emulsion of claim 1 to a flavored syrup.

19. A process of preparing a cloudy beverage as defined in claim 12, comprising the step of adding still or carbonated water to the beverage syrup of claim 11.

20. A process of preparing a cloudy beverage comprising the steps of drying a beverage clouding agent of claim 1 to form a dry mix having a moisture content no higher than about 5% to form a beverage powder, and finally converting said powder to a cloudy beverage by the addition of water.

21. A dry beverage powder prepared by drying a beverage clouding agent of claim 1 to form a dry mix having a moisture content no higher than about 5%.

22. The process of preparing a cloudy beverage as recited in claim 20, wherein the dry mix having a moisture content no higher than about 5% is mixed with an ingredient selected from the group consisting of a solid edible acid, dry color, a sweetener and combinations thereof.

23. The dry beverage powder of claim 21, wherein the dry mix having a moisture content no higher than about 5% is mixed with an ingredient selected from the group consisting of a solid edible acid, dry color, a sweetener and combinations thereof.

* * * * *

UNITED STATES PATENT AND TRADEMARK OFFICE
CERTIFICATE OF CORRECTION

PATENT NO. : 4,508,744
DATED : April 2, 1985
INVENTOR(S) : Albert J. Kruger and John K. Johnson It is certified that error appears in the above—identified patent and that said Letters Patent is hereby corrected as shown below:

Claim 16, should appear as shown below:

--16. A process of preparing a beverage clouding agent, comprising the steps of heating a homogeneous solution of water, a water-soluble gum, a polyhydric alcohol of two to six carbons and an edible salt to a temperature of about 95° - 100°C, adding carnauba wax and stirring until melted, and finally homogenizing the entire mixture in a heat jacketed, 2 stage pressure homogenizer, maintained at a temperature between about [95] 92° - 100°C., and also having a total pressure of between about 3000° - 7500 psi, to produce an emulsion having a wax interfacial area of $12.5 m^2/cm^3$ to $15.0 m^2/cm^3$, wherein the weight ratio of wax to salt is about 1:2 to 2:3, and the weight ratio of wax to alcohol is about 1:4 to 1:3.--

Signed and Sealed this

Third Day of March, 1987

Attest:

DONALD J. QUIGG

Attesting Officer

Commissioner of Patents and Trademarks